United States Patent [19]

Moldoveanu et al.

[11] Patent Number: 5,581,514

[45] Date of Patent: Dec. 3, 1996

[54] SURFACE SEISMIC PROFILE SYSTEM AND METHOD USING VERTICAL SENSOR

[75] Inventors: Nicolae Moldoveanu, Houston; William T. McDavid, Plano; Michael T. Spradley, Cypress, all of Tex.

[73] Assignee: Geco-Prakla, Inc., Houston, Tex.

[21] Appl. No.: 150,229

[22] Filed: Nov. 10, 1993

[51] Int. Cl.[6] ............................. G01V 1/18; G01V 1/36; G01V 1/38

[52] U.S. Cl. ................. 367/16; 367/24; 367/57; 367/58; 181/110

[58] Field of Search ..................... 367/15, 16, 24, 367/57, 58; 181/110

[56] References Cited

U.S. PATENT DOCUMENTS

| | | | |
|---|---|---|---|
| 2,992,694 | 7/1961 | Musgrave et al. | 367/57 |
| 3,943,484 | 3/1976 | Balderson | 367/16 |
| 4,405,036 | 9/1983 | Wener et al. | 181/110 |
| 4,516,227 | 5/1985 | Wener et al. | 367/15 |
| 4,558,437 | 12/1985 | Meeder et al. | 367/15 |
| 4,958,328 | 9/1990 | Stubblefield . | |
| 5,253,217 | 10/1993 | Justice et al. | 367/57 |
| 5,253,223 | 10/1993 | Svenning et al. | 367/128 |

OTHER PUBLICATIONS

Knapp, "Geophone differencing to attenuate horizontally propagating noise", *Geophysics*, vol. 51, No. 9, Sep. 1986; pp. 1743–1759.

Monk, "Wavefield separation of twin streamer date", *First Break*, vol. 8, No. 3, Mar. 1990; pp. 96–104.

Brink, "Marine seismic exploration using vertical receiver arrays: A means for reduction of weather downtime", 49th Meeting of the European Association of Exploration Geophysicists, Jun. 9–12, 1987.

*Primary Examiner*—Nelson Moskowitz
*Attorney, Agent, or Firm*—Fish & Richardson P.C.

[57] ABSTRACT

The seismic profile system and method using vertical sensor arrays relate to obtaining a seismic profile under two highly reflective boundaries. The system includes a source of seismic energy disposed beneath the air/water boundary, a first pair of sensors arranged in vertical relation and spaced apart by a predetermined vertical spacing distance, and a second pair of sensors similarly situated and spaced from the first pair by a predetermined horizontal spacing distance. The first and second pairs of sensors are disposed below at least two highly reflective boundaries, which may be the air/water boundary and a mud/water boundary. According to the method, the source is moved between two points and data is collected from the first and second pairs of sensors.

26 Claims, 5 Drawing Sheets

SURFACE SEISMIC PROFILE SYSTEM AND METHOD USING VERTICAL SENSOR

BACKGROUND OF THE INVENTION

The invention relates to seismic profile systems. More particularly, the invention relates to a surface seismic profile system and method using vertical sensor arrays.

Various methods are known for obtaining seismic profiles of a desired geographical location on land. One of the known methods is the vertical seismic profile (VSP), which is illustrated in FIG. 1. The VSP method requires the existence of a bore hole 1 drilled to a depth "D" below the surface 3. Bore hole depths vary widely, but the bore hole is typically on the order of several thousand or more feet deep.

A plurality of sensors 5 are placed at vertically spaced locations within the bore hole. The sensors may be geophones secured within the bore hole, or may be hydrophones in the event the bore hole is filled with a liquid. A source 7 of seismic energy is placed on the surface at various distances and angular positions with respect to the bore hole, and the signals received by the sensors are collected by a monitor 9.

The important signals from the standpoint of obtaining an accurate seismic profile are the "primary" reflection signals (shown here as P1–P4) which are reflected off a boundary 11 between different subsurface layers 10 and 12 and are received by the sensors as upgoing waves. Direct signals from the source (e.g., D1) are also received by the sensors and can be used for timing purposes. A potential problem is created, however, by those waves (e.g., R1) which are reflected twice; once off the boundary 11 and again off the surface 3. These multiply reflected signals are received as downgoing waves and are 180 degrees out of phase with the primary signals, and thus potentially cause destructive interference with the primary signals known as "ghosting". However, as explained, for instance, in U.S. Pat. No. 4,958,328 to Stubblefield, the vertical arrangement of the sensors allows upgoing and downgoing waves to be distinguished during processing of the data. Thus, the deleterious effects of the downgoing waves can be reduced.

The VSP method is, therefore, well suited for obtaining seismic profiles in the vicinity of an existing bore hole. It is, however, severely limited in the horizontal direction because its effectiveness decreases rapidly as the source is moved away from the bore hole. It is also limited in that it requires the existence of a bore hole in the first place. If no bore hole exists in the vicinity to be surveyed, it would most likely not be cost-effective to drill one simply to allow the VSP method to be utilized.

An application of VSP is also known in the marine environment. In water, the VSP method can be used to advantage because the vertically stacked sensors are no longer limited to a bore hole. As shown in FIG. 2, two sensors 5 can be suspended vertically in the water from a buoy 13, which includes a transmitter 13a for relaying data to a recorder (not shown). A boat 14 tows a source 7 underwater in the vicinity of the sensors. Primary signal P1 is reflected off the boundary 11 between layers 10 and 12 under the sea floor 15 and is received by the sensors 5 as an upgoing wave. Multiply reflected signal R1, which has been reflected off the boundary 11 and the air/water boundary 19, is received by the sensors as a downgoing wave, generating what is known as a source ghost. Multiply reflected signal R1 is an example of only one multiply reflected signal which may occur; many other multiple reflections occur off the air/water boundary 19, the sea floor 15, and the boundary 11. All of these multiply reflected signals interfere with the primary reflected signals, and thus reduce the accuracy of the data obtained by the survey.

Another seismic profile method is known which allows greater flexibility on land in the horizontal direction. The horizontal seismic profile (HSP) method, illustrated in FIG. 3, employs an array of sensors 5 placed on the surface 3 at predetermined locations with respect to a source 7. Primary signals ($P_1$, $P_2$, $P_3$) are reflected off the boundary 11 and are detected by the sensors 5. The source and the sensors can be moved horizontally relatively easily to increase the area of the survey. Thus, the HSP method permits a widely spaced profile. However, the HSP method cannot easily distinguish between primary reflections and multiply reflected waves, because all signals received by the sensors are upgoing. For instance, it is impossible to distinguish between multiply reflected signal R1 and primary reflected signal P3 using the HSP method. Thus, it is difficult to obtain accurate data using this prior art method.

The problems discussed above are further aggravated by the geology of "transition zones", that is, those areas which are between the open water and land. Typically, transition zones are characterized by a relatively shallow layer of water over a layer of mud with harder composite or rock layers underneath (see FIG. 4). The air/water boundary 19, the water/mud boundary 23, and the mud/rock boundary 24 are all efficient reflectors. As a result, the desired data are compromised by multiply reflected waves such as R2 which are reflected off the boundary 11, the air/water boundary, the water/mud boundary, and are then received by the sensors. Since this is an upgoing wave, it is virtually impossible to distinguish this wave from an upgoing primary reflection signal.

Transition zones pose a number of problems which are unique to this geology and are not encountered in typical land and marine applications. As explained above, one of these problems is the existence of multiple efficient reflective layers which cause multiple reflections and thus interfere with the primary reflected wave. In addition, wind and surf noise are problems in transition zones. Further, the existence of a lossy medium (mud) in the near surface results in attenuation of high frequencies. Also, only a small number of sensors are typically available due to logistical problems in deployment.

Despite the importance of transition zones to the oil and gas industry, the previously known methods of seismic profiling encounter difficulties in these regions as a result of poor signal to noise ratio and poor resolution of the seismic data.

SUMMARY OF THE INVENTION

The invention relates to a seismic profile system and method which overcome the difficulties discussed above and allow accurate surveying of transition zones. In some embodiments, the invention comprises a source of seismic energy disposed beneath the air/water boundary; a first pair of sensors arranged in vertical relation and spaced apart by a predetermined vertical spacing distance, the first pair of sensors being disposed below at least two highly reflective boundaries; and a second pair of sensors arranged in vertical relation and spaced apart by the predetermined vertical spacing distance, the second pair of sensors being disposed below the at least two highly reflective boundaries and being horizontally displaced from the first pair of sensors by a predetermined horizontal spacing distance.

In other embodiments, the invention relates to a seismic profile system for use in a transition zone having a mud layer covered by a water layer, the system comprising a source of seismic energy; a first pair of sensors placed in the mud layer in vertical relation and spaced apart by a predetermined vertical spacing distance; and a second pair of sensors placed in the mud layer in vertical relation and spaced apart by the predetermined vertical spacing distance, the second pair of sensors being horizontally displaced from the first pair of sensors by a predetermined horizontal spacing distance.

In other embodiments, the invention relates to a method for obtaining a seismic profile under an air/water boundary, comprising the steps of: placing a first pair of sensors in vertical relation under at least two highly reflective boundaries such that the sensors are spaced apart by a predetermined vertical spacing distance; placing a second pair of sensors in vertical relation under the at least two highly reflective boundaries such that the sensors are spaced apart by the predetermined vertical spacing distance and the second pair of sensors are displaced horizontally from the first pair of sensors by a predetermined horizontal spacing distance; placing a source of seismic energy under the air/water boundary at a first position with respect to the first and second pairs of sensors and collecting data from the first and second pairs of sensors; and placing a source of seismic energy under the air/water boundary at a second position with respect to the first and second pairs of sensors and collecting data from the first and second pairs of sensors.

In other embodiments, the invention relates to a seismic profile system for obtaining a seismic profile, comprising: a source of seismic energy disposed beneath a first reflective boundary; a first pair of sensors arranged in vertical relation and spaced apart by a predetermined vertical spacing distance, the first pair of sensors being disposed below the reflective boundary and at least one additional reflective boundary; and a second pair of sensors arranged in vertical relation and spaced apart by the predetermined vertical spacing distance, the second pair of sensors being disposed below the reflective boundary and the at least one additional reflective boundary and being horizontally displaced from the first pair of sensors by a predetermined horizontal spacing distance.

DESCRIPTION OF THE PREFERRED EMBODIMENTS

Preferred embodiments of the invention will now be described in detail with reference to the accompanying figures.

Figure 1:
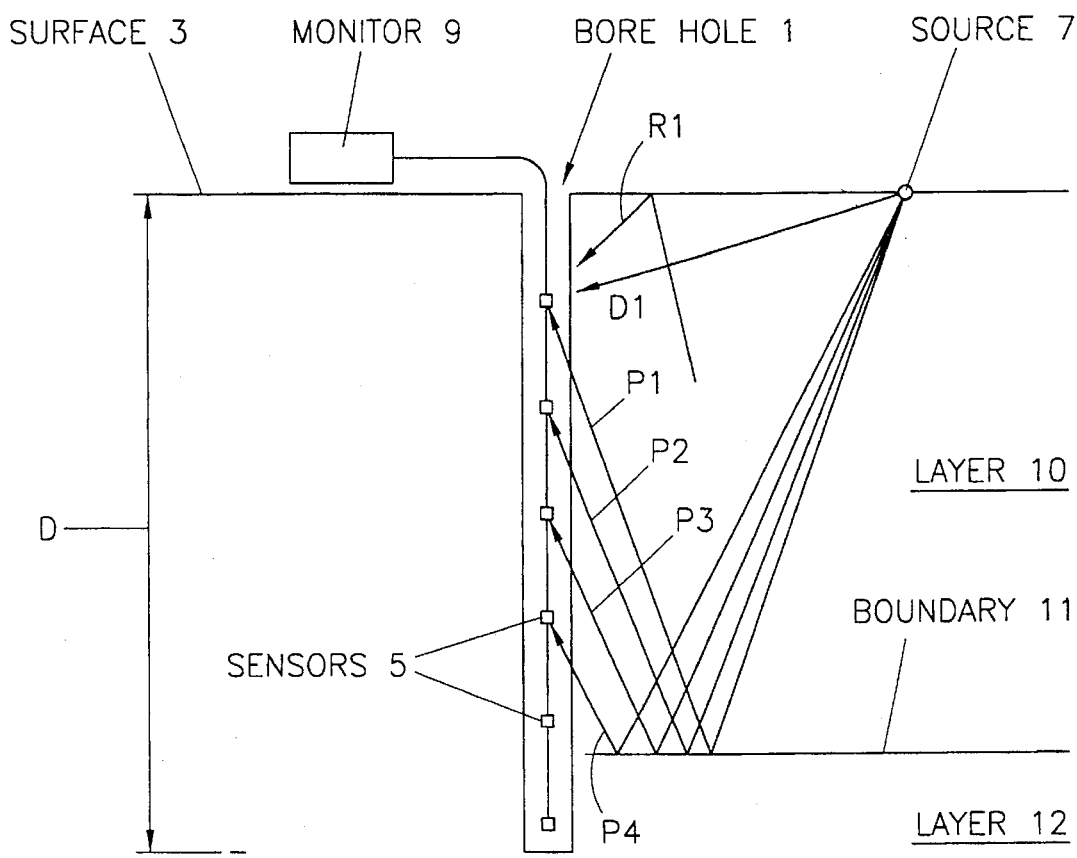
FIG. 1 is an illustration of a known vertical seismic profile system.
Figure 2:
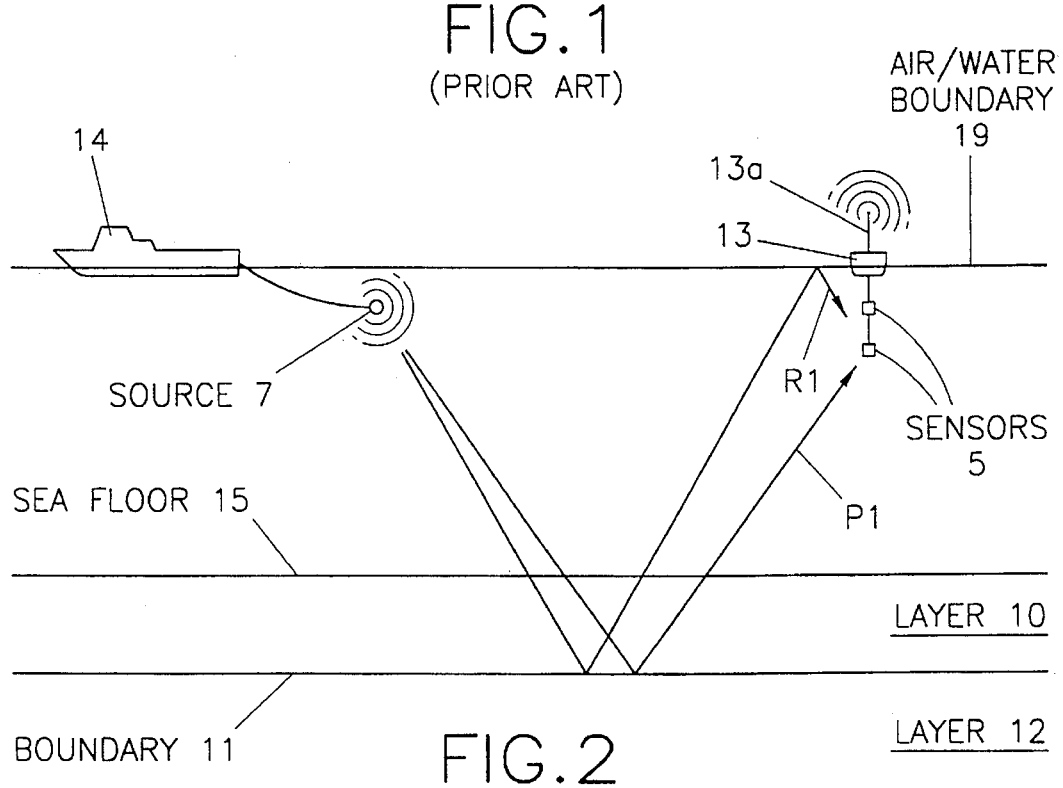
FIG. 2 is an illustration of a known vertical seismic profile system in water.
Figure 3:
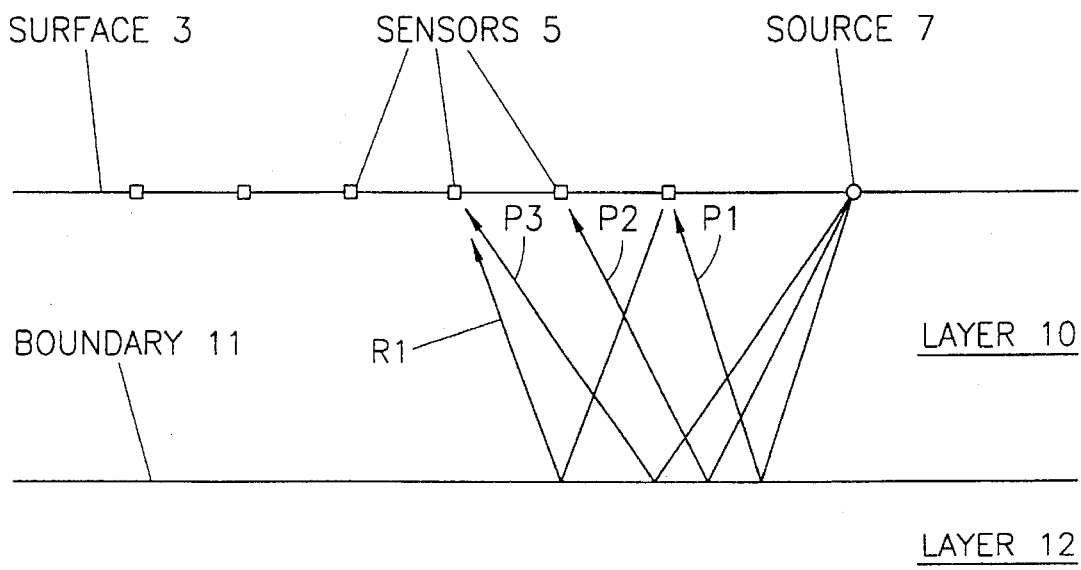
FIG. 3 is an illustration of a known horizontal seismic profile system.
Figure 4:
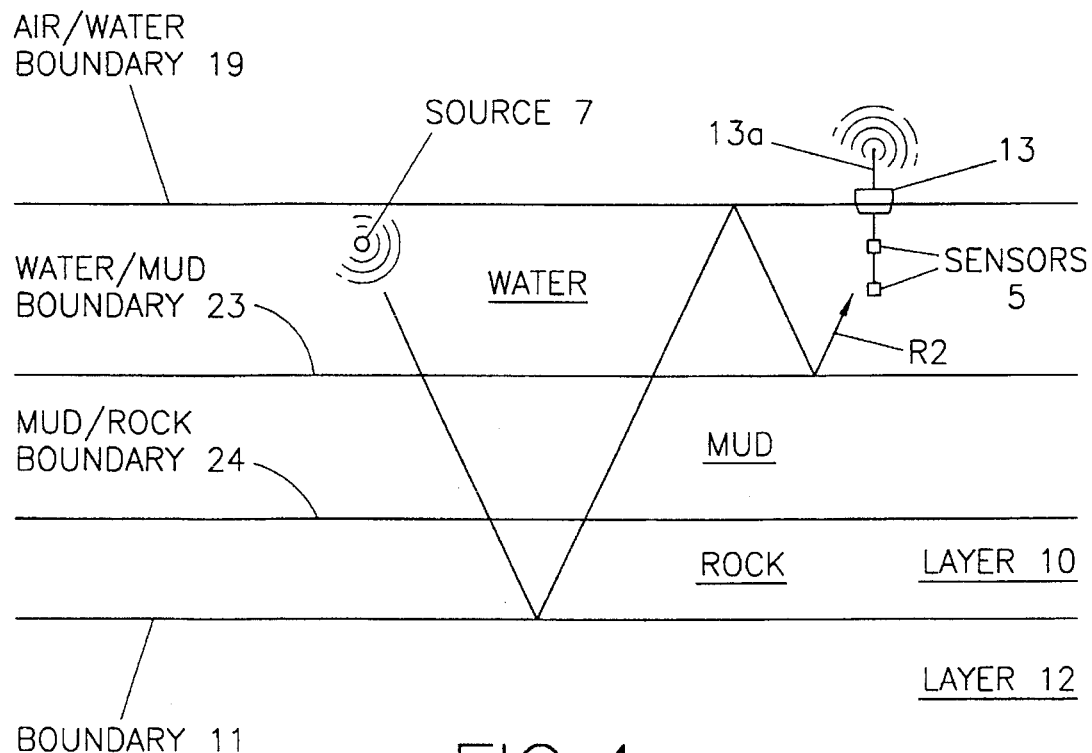
FIG. 4 is an illustration of a known seismic profile system applied to a transition zone.
Figure 5:
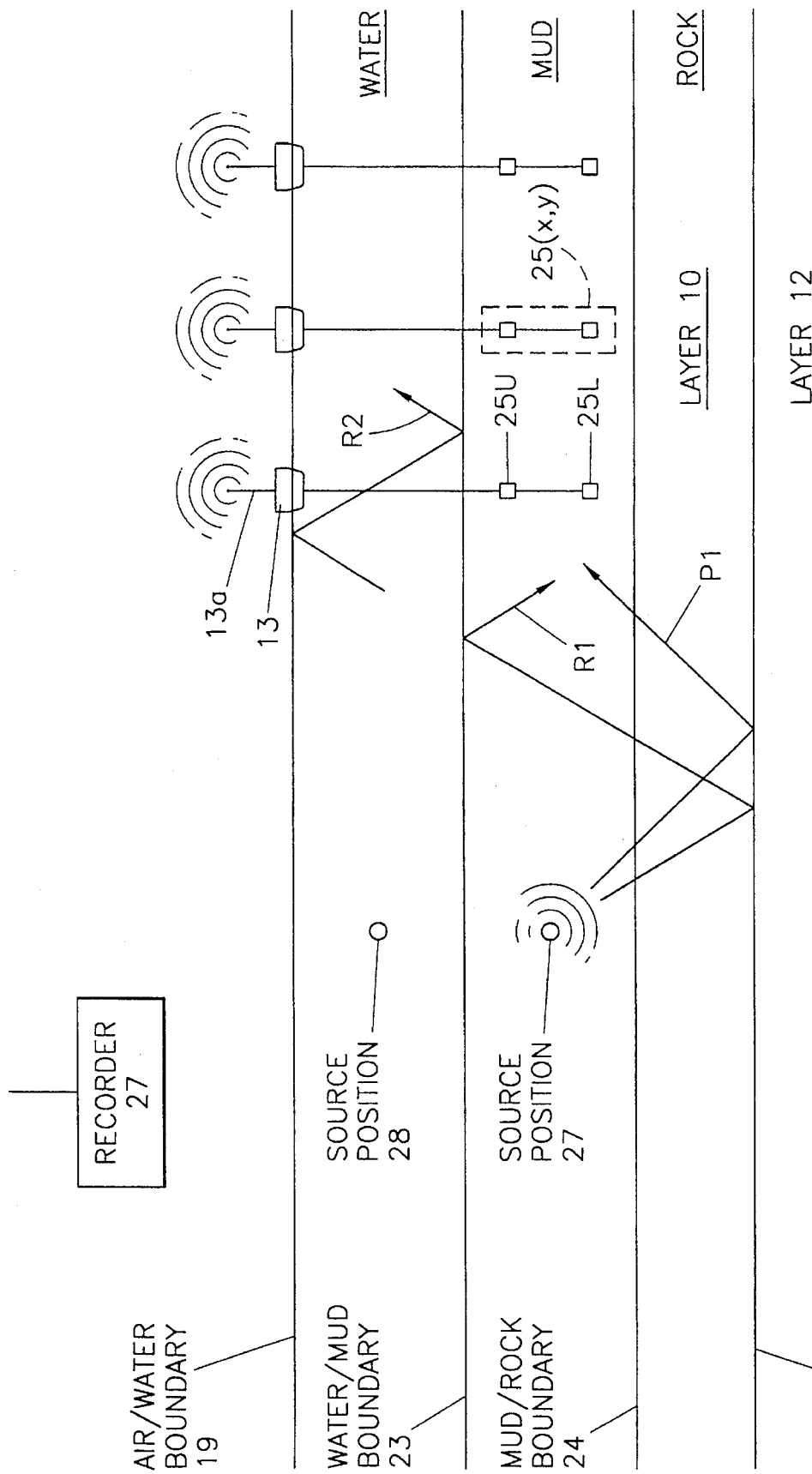
FIG. 5 is an illustration of one embodiment of the seismic profile system of the invention applied to a transition zone.
Figure 6:
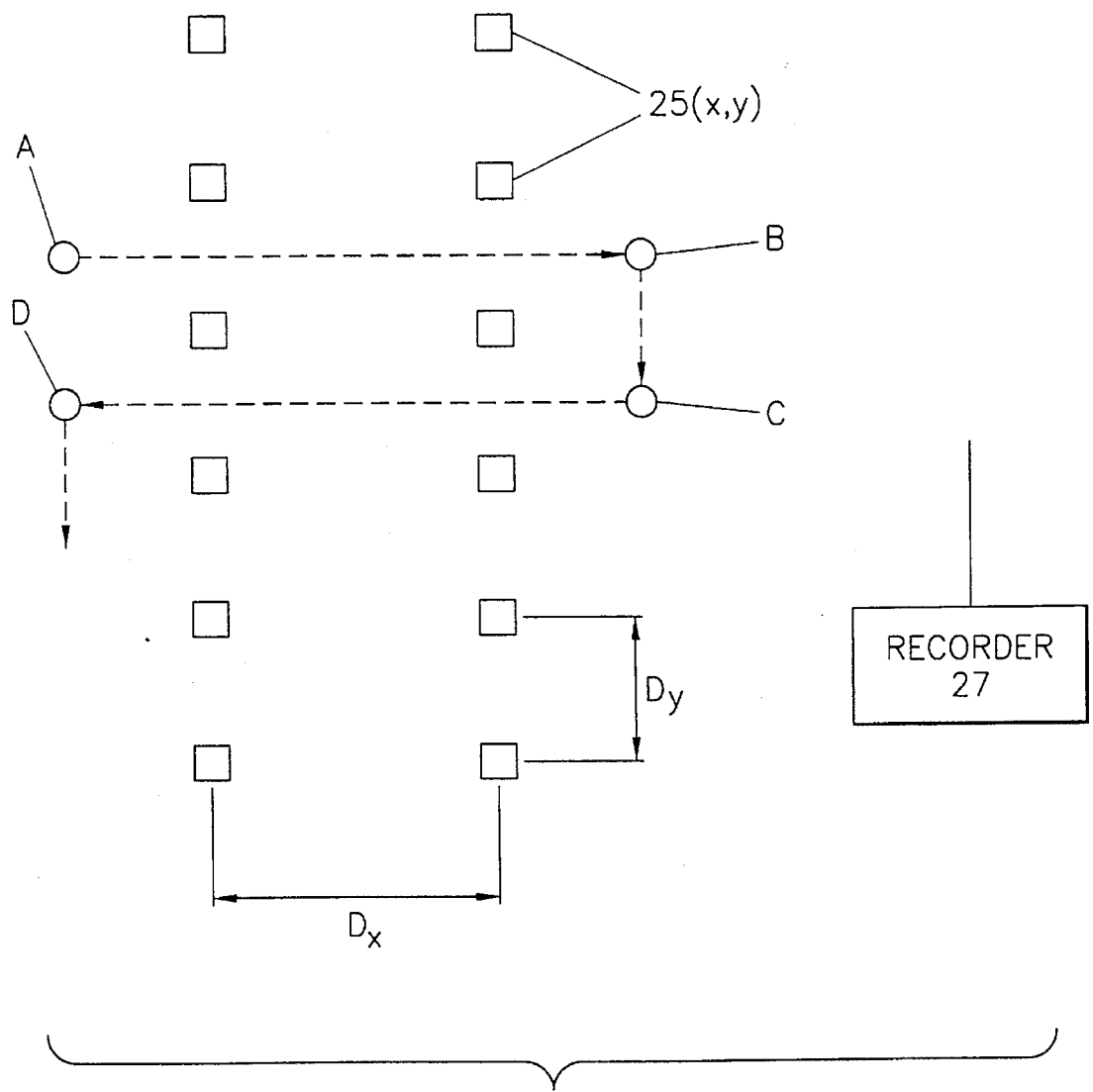
FIG. 6 is a top view of the system of FIG. 4.

A preferred embodiment of the invention for use in transition zones is shown in FIGS. 5 and 6 wherein sensor pairs 25 are disposed in the mud layer at coordinate locations (x,y). The pairs are stacked vertically and include an upper sensor 25U and a lower sensor 25L electrically connected to a transmitter 13a mounted on a buoy 13 (or otherwise connected to a recorder). The spacing between the upper and lower sensors may vary, but is typically on the order of 5 feet or more. The upper sensor 25U is preferably placed at least 5 feet into the mud layer.

As shown in FIG. 6, which is a top view of the layout of the sensor pairs 25, the sensor pairs are preferably arranged in a grid with a separation in one direction of $D_x$ and in the other orthogonal direction of $D_y$. The separation in each orthogonal direction is dependent upon the type of survey desired, but is typically on the order of 100 feet. Generally, the spacing between sensor pairs in one direction ($D_y$) is smaller than in the other, although this is not required. While only two columns and six rows are shown in FIG. 6, the size of the grid may be varied depending on the geological/geophysical objectives and cost considerations.

The source of seismic energy is preferably placed in the mud layer (position 27 in FIG. 5) and may, for instance, be a dynamite charge. Optionally, the source can be placed within the water layer at position 28.

Because both sensors in each stacked sensor pair 25 are below the water/mud boundary, the problem discussed above with respect to upgoing waves reflected off the mud/water boundary 21 is avoided. Referring to FIG. 5, the signal of interest is the primary reflected signal P1, which is reflected off the boundary 11 and detected directly by each of the sensors 25U, 25L. A multiply reflected wave R1, which is reflected off the water/mud boundary 23, may potentially cause ghosting, but can be filtered out by distinguishing between upgoing and downgoing waves. The multiply reflected wave which causes the most severe problems in transition zone environments is R2, i.e., the wave which is reflected off the air/water boundary 19 and again off the water/mud boundary 23. Because both the air/water boundary and the mud/water boundary are highly efficient reflectors, this wave has a large amplitude and hence has the potential to significantly distort the data. Moreover, because the wave is upgoing after it is reflected off the water/mud boundary, it is impossible to filter this wave out by distinguishing between upgoing and downgoing waves.

The invention overcomes this problem by placing both the sensors 25U, 25L below both the mud/water boundary and the air/water boundary. Thus, as long as the sensors are below these two highly efficient reflecting boundaries, the upgoing multiply reflected wave R2 is not problematic.

Various methods exist for placing the sensor pairs in the mud layer. A preferred method involves the use of a vibrating ram available from G&A Augers in LaRose, La. The vibrating ram is a 40 to 60 foot pipe with gears welded along its length driven by a diesel engine through a gear box. A hydrophone or marsh geophone is inserted into the end of the pipe, and a disposable anchor/point is placed over the end of the pipe, covering and protecting the inserted device. The pipe is then rammed into the earth to the desired depth. When the ram is pulled back up, the suction created pulls the anchor/point off and the loaded device out of the pipe. The ram can also be used for placing a source such as an explosive charge, and in this respect as the pipe travels upward, the suction closes the hole behind it, providing a good explosive tamping seal.

The vibrating ram allows crews to place 40 to 60 foot holes into sedimentary type earth in a short period of time, thus providing significant cost savings over conventional methods. The ram may also, for instance, be mounted on a small self-propelled barge or marsh buggy for use in marsh regions such as those found in southern La. The ram would not, however, be effective in areas having other than sedimentary type earth.

Another method for placing the source charge and the sensor pairs involves the use of a conventional rotary drill. Rotary drills are commonly used in seismic exploration and involve simply a drill bit and drill stem rotated by an engine.

Another commonly used tool in seismic exploration which can be used to place the source charge and the sensors is a water flush drill. Water flush drills are usually portable devices which use a water pump to send a stream of water through a stem. The stem is pointed at the earth and the water flushes its way through sedimentary earth, thereby creating a hole for placement of the sensors or the charge.

Once the sensor pairs are in place, measurements are then taken with the source in a first location such as point A in FIG. 6. Subsequently, the source is moved across the grid generally perpendicular to the closely spaced axis of the grid (the Y axis in FIG. 6) to a second location (point B). The source is then moved laterally to another point along the grid (point C), and is then moved back across the grid (point D). This procedure is repeated for a desired number of crossings, depending upon sensor spacing, the number of sensors in the grid and the requirements of the survey being conducted. It will be appreciated that measurements may be taken with the source at any point within or in the vicinity of the grid as is necessary to meet the desired objectives. Also, in the event that an explosive is used as the source, it will be appreciated that the source itself is not actually moved, but instead multiple sources are employed at the various locations.

Figure 7:
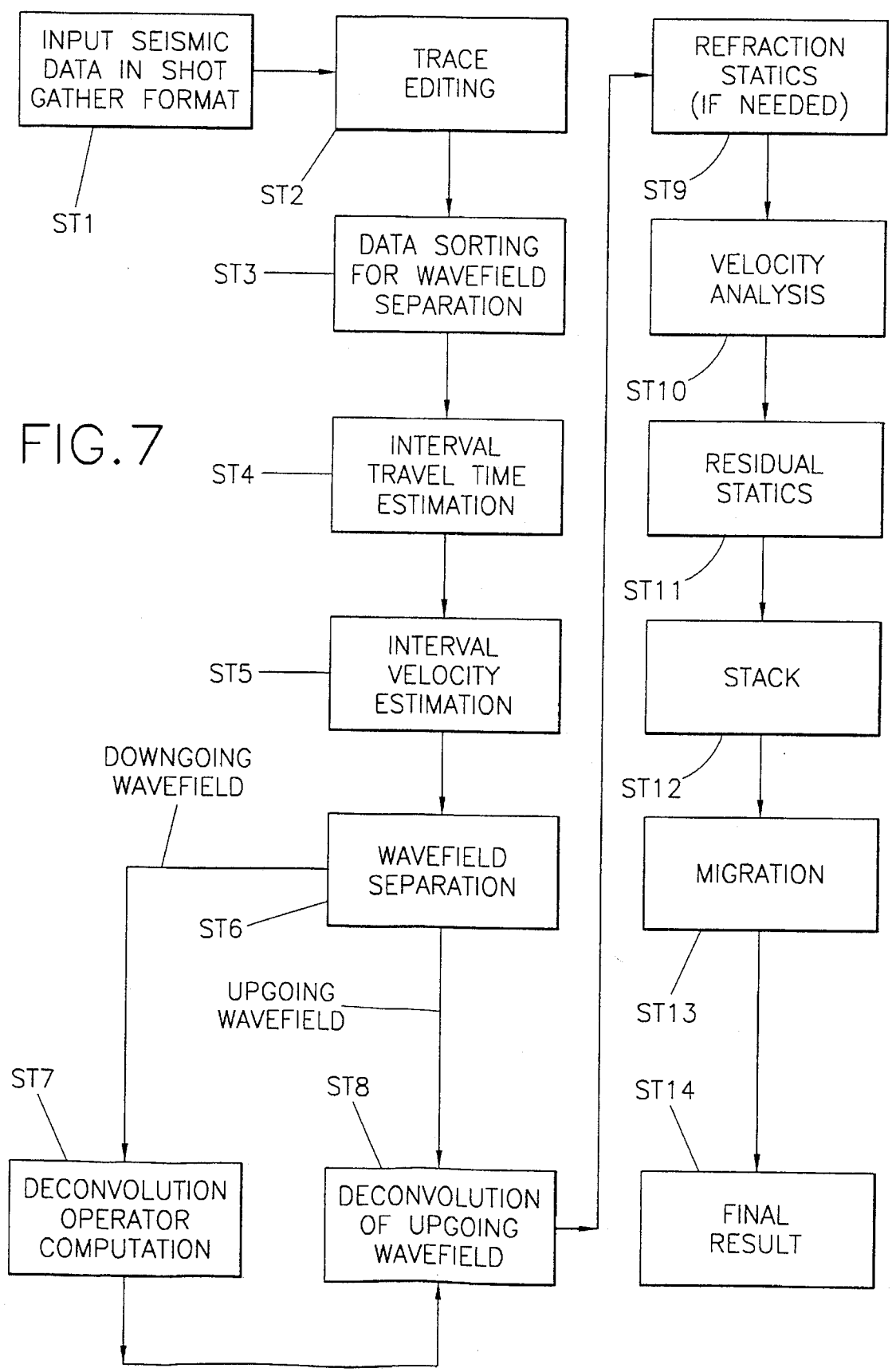
FIG. 7 is a flow chart illustrating processing of data obtained by the system of FIG. 5.

The raw data from the various sensors are collected and stored by a recorder 27 in a conventional manner. To process these data into a meaningful seismic profile, the procedure illustrated in the flow chart of FIG. 7 is executed by a data processing device (not shown). First, the data are input to the processor in state ST1. The data are read in shot gather format, i.e., trace-by-trace and shot-by-shot. The number of traces for one shot corresponds to the number of recorded channels. Then, trace editing is performed in state ST2. In this step, each trace and each shot are inspected for noise, and the noisy traces and shots are edited by removing spikes in some instances or, in very noisy cases, zeroing the data. In state ST3, the data are sorted for wavefield separation. For each shot, the data are sorted to obtain first the traces which correspond to the upper sensors, followed by the traces corresponding to the lower sensors. Then, in state ST4, the time delay for the seismic wavefield to travel from the lower sensor to the upper sensor of each sensor pair is computed using a cross-correlation technique. Based on this, the interval velocity of the medium in which the upper and lower sensors are deployed is statistically estimated (ST5).

Wavefield separation is achieved in state ST6. The total seismic wavefield $S(z1)$ recorded at level $z1$ (corresponding to the lower sensor) consists of the downgoing wavefield $D(z1)$ plus the upgoing wavefield $U(z1)$:

$$S(z1)=D(z1)+U(z1).$$

Similarly, the total seismic wavefield recorded at the level $z2$ (corresponding to the upper sensor) is:

$$S(z2)=D(z2)+U(z2).$$

The wavefield at the level $z2$ is extrapolated at the level $z1$ using the one way extrapolators Wu and Wd:

$$U(z1)=Wu(z1, z2)U(z2)$$

$$D(Z1)=Wd(z1, z2)D(z2)$$

where $$Wu(z1,z2) = \exp(-i \sqrt{k^2 - k_x^2} \; \Delta z)$$

$$Wd(z1,z2) = \exp(i \sqrt{k^2 - k_x^2} \; \Delta z)$$

and $$\Delta z = z_1 - z_2$$

$$k^2 = k_x^2 + k_z^2 = \left(\frac{w}{v}\right)^2$$

where v is the velocity estimated in state ST5 and w is the frequency. The separation of the upgoing and downgoing components is done based on the following relations:

$$D(z_2) = \frac{S(z_1) - Wu(z_1,z_2)S(z_2)}{W_D(z_1,z_2) - Wu(z_1,z_2)}$$

$$U(z_2) = \frac{W_D(z_1,z_2)S(z_2) - S(z_1)}{W_D(z_1,z_2) - Wu(z_1,z_2)}$$

In state ST7, a deconvolution operator is computed from the downgoing wavefield, and this deconvolution operator is applied to the upgoing wavefield for deconvolution of the upgoing wavefield (ST8).

In state ST9, a refraction statics computation is performed when necessary. To do this, the first arrivals are picked and, based on these, a model of the near surface is derived. The shot and sensor pair statics are estimated from this model and are then applied to each trace. In state ST10, the seismic data are sorted into common midpoint gathers and the stacking velocities are computed at certain locations along the line. Using the stacking velocities, move-out corrections are computed and applied to each seismic trace. Residual static corrections are then computed for each source and source pair (ST11). This can be done in multiple iterations until an optimum solution is found. The residual statics are then applied to each seismic trace. Subsequently, the seismic traces which belong to the same common mid-point position are stacked together (ST12) and the stacked traces are migrated to the proper space and time position using a wave equation migration algorithm (ST13). The migrated section is then properly filtered, normalized, and displayed as the final result (ST14).

While there have been shown and described various embodiments of the invention, the invention is not limited thereto, but instead is defined by the scope of the following claims.

What is claimed is:

1. A seismic profile system for obtaining a seismic profile under an air/water boundary, comprising:

a source of seismic energy disposed beneath the air/water boundary;

a first pair of sensors arranged in vertical relation and spaced apart by a predetermined vertical spacing distance, said first pair of sensors being disposed below the air/water boundary and a mud/water boundary;

a second pair of sensors arranged in vertical relation and spaced apart by said predetermined vertical spacing distance, said second pair of sensors being disposed below the air/water boundary and the mud/water boundary and being horizontally displaced from said first pair of sensors by a predetermined horizontal spacing distance; and means for discriminating between an upgoing seismic wave and a downgoing seismic wave using said vertically spaced sensors.

2. A seismic profile system as claimed in claim 1, wherein said source is disposed below the mud/water boundary.

3. A seismic profile system as claimed in claim 1, wherein an upper one of each of said first and second pairs of sensors is at least five feet below the mud/water boundary.

4. A seismic profile system as claimed in claim 1, wherein said predetermined vertical spacing distance is greater than 5 feet.

5. A seismic profile system as claimed in claim 1, wherein said predetermined horizontal spacing distance is approximately 100 feet.

6. A seismic profile system as claimed in claim 1, further comprising third and fourth pairs of sensors, said third and fourth pairs of sensors being disposed parallel to said first and second pairs of sensors and having said predetermined horizontal spacing distance therebetween.

7. A seismic profile system as claimed in claim 6, wherein a spacing distance between said first and third pairs of sensors and said second and fourth pairs of sensors, respectively, is greater than said predetermined horizontal spacing distance.

8. A seismic profile system as claimed in claim 1, wherein said sensors are hydrophones, and further comprising wireless transmission means for transmitting data to a remote receiver.

9. A seismic profile system for use in a transition zone having a mud layer covered by a water layer, said system comprising:

a source of seismic energy;

a first pair of sensors placed in the mud layer in vertical relation and spaced apart by a predetermined vertical spacing distance;

a second pair of sensors placed in the mud layer in vertical relation and spaced apart by said predetermined vertical spacing distance, said second pair of sensors being horizontally displaced from said first pair of sensors by a predetermined horizontal spacing distance; and means for discriminating between an upgoing seismic wave and a downgoing seismic wave using said first and second pairs of sensors.

10. A seismic profile system as claimed in claim 9, wherein said source is disposed in the water layer.

11. A seismic profile system as claimed in claim 9, wherein said source is disposed in the mud layer.

12. A seismic profile system as claimed in claim 9, wherein said predetermined vertical spacing distance is greater than 5 feet.

13. A seismic profile system as claimed in claim 9, wherein said predetermined horizontal spacing distance is approximately 100 feet.

14. A seismic profile system as claimed in claim 9, further comprising third and fourth pairs of sensors, said third and fourth pairs of sensors being disposed parallel to said first and second pairs of sensors and having said predetermined horizontal spacing distance therebetween.

15. A seismic profile system as claimed in claim 14, wherein a spacing distance between said first and third pairs of sensors and said second and fourth pairs of sensors, respectively, is greater than said predetermined horizontal spacing distance.

16. A seismic profile system as claimed in claim 9, wherein said sensors are hydrophones, and further comprising wireless transmission means for transmitting data to a remote receiver.

17. A method for obtaining a seismic profile under an air/water boundary, comprising the steps of:

placing a first pair of sensors in vertical relation under the air/water boundary and a mud/water boundary such that said sensors are spaced apart by a predetermined vertical spacing distance;

placing a second pair of sensors in vertical relation under the the air/water boundary and the mud/water boundary such that said sensors are spaced apart by said predetermined vertical spacing distance and said second pair of sensors are displaced horizontally from said first pair of sensors by a predetermined horizontal spacing distance;

placing a source of seismic energy under the air/water boundary at a first position with respect to said first and second pairs of sensors and collecting data from said first and second pairs of sensors;

placing a source of seismic energy under the air/water boundary at a second position with respect to said first and second pairs of sensors and collecting data from said first and second pairs of sensors; and discriminating between an upgoing seismic wave and a downgoing seismic wave using said first and second pairs of sensors.

18. A method as claimed in claim 17, wherein a first source of seismic energy placed at said first position and a second source of seismic energy is placed at said second position.

19. A method as claimed in claim 17, further comprising the step of moving said source of seismic energy placed at said first position to said second position.

20. A method as claimed in claim 17, wherein the sources placed at said first and second positions are placed below the mud/water boundary.

21. A method as claimed in claim 17, further comprising the steps of placing third and fourth pairs of sensors parallel to said first and second pairs of sensors so as to have said predetermined horizontal spacing distance therebetween.

22. A method as claimed in claim 21, wherein a spacing distance between said first and third pairs of sensors and said second and fourth pairs of sensors, respectively, is greater than said predetermined horizontal spacing distance.

23. A method as claimed in claim 22, wherein said first and second positions lie on a line parallel to a line intersecting said first and third pairs of sensors.

24. A seismic profile system for obtaining a seismic profile, comprising:

a source of seismic energy disposed beneath a first reflective boundary;

a first pair of sensors arranged in vertical relation and spaced apart by a predetermined vertical spacing distance, said first pair of sensors being disposed below said reflective boundary and at least one additional reflective boundary;

a second pair of sensors arranged in vertical relation and spaced apart by said predetermined vertical spacing distance, said second pair of sensors being disposed below said reflective boundary and said at least one additional reflective boundary and being horizontally displaced from said first pair of sensors by a predetermined horizontal spacing distance; and means for discriminating between an upgoing seismic wave and a downgoing seismic wave using said first and second pairs of sensors.

25. A seismic profile system as claimed in claim 24, wherein said reflective boundary and said at least one additional reflective boundary comprise an air/water boundary and a mud/water boundary.

26. A seismic profile system as claimed in claim 25, wherein said source is disposed below the mud/water boundary.

* * * * *

UNITED STATES PATENT AND TRADEMARK OFFICE
CERTIFICATE OF CORRECTION

PATENT NO. : 5,581,514
DATED : December 3, 1996
INVENTOR(S) : Moldoveanu et al.

It is certified that error appears in the above-indentified patent and that said Letters Patent is hereby corrected as shown below:

Cover page, under "[54]", and Column 1, line 2, after "sensor", please insert -- Arrays--.

Col. 8, line 17, please delete the second occurrance of "the".

Signed and Sealed this

Fourth Day of March, 1997

Attest:

BRUCE LEHMAN

Attesting Officer

Commissioner of Patents and Trademarks